(12) United States Patent
Berglund

(10) Patent No.: US 9,616,498 B2
(45) Date of Patent: Apr. 11, 2017

(54) METHOD FOR MANUFACTURING A VALVE SPINDLE

(71) Applicant: SANDVIK INTELLECTUAL PROPERTY AB, Sandviken (SE)

(72) Inventor: Tomas Berglund, Falun (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 33 days.

(21) Appl. No.: 14/778,096

(22) PCT Filed: Mar. 11, 2014

(86) PCT No.: PCT/EP2014/054724
§ 371 (c)(1),
(2) Date: Sep. 18, 2015

(87) PCT Pub. No.: WO2014/146934
PCT Pub. Date: Sep. 25, 2014

(65) Prior Publication Data
US 2016/0279711 A1 Sep. 29, 2016

(30) Foreign Application Priority Data
Mar. 18, 2013 (EP) .................................... 13446502

(51) Int. Cl.
*F16K 1/12* (2006.01)
*F01L 3/20* (2006.01)
(Continued)

(52) U.S. Cl.
CPC .................. *B22F 7/08* (2013.01); *B22F 3/15* (2013.01); *B22F 5/008* (2013.01); *F01L 3/04* (2013.01);
(Continued)

(58) Field of Classification Search
CPC ....... F16K 1/12; F01L 3/00; F01L 3/02; F01L 3/04; B22F 3/15; B22F 5/008; B22F 7/08
(Continued)

(56) References Cited

U.S. PATENT DOCUMENTS

| 6,173,702 B1 * | 1/2001 | Hoeg | ...................... C22C 1/04 |
| | | | 123/668 |
| 6,298,817 B1 * | 10/2001 | Hoeg | ...................... C22C 19/05 |
| | | | 123/188.2 |
| 2011/0209468 A1 * | 9/2011 | Hoeg | ...................... B22F 3/15 |
| | | | 60/324 |

FOREIGN PATENT DOCUMENTS

| JP | H1150821 A | 2/1999 |
| WO | 2010083831 A1 | 7/2010 |
| WO | 2011050815 A1 | 5/2011 |

* cited by examiner

*Primary Examiner* — Marina Tietjen
(74) *Attorney, Agent, or Firm* — Corrine R. Gorski

(57) ABSTRACT

A method for manufacturing a valve spindle having a valve disc and a valve stem, the method comprising the steps of: providing a capsule, which defines at least a portion of the valve disc; arranging, in the capsule, a preformed core body that includes a core head, which constitutes an inner portion of the valve disc; arranging a preformed annular valve seat in the capsule, wherein the valve seat is arranged such that the inner circumferential side of the valve seat at least partially defines an inner space around the core head; filling the inner space with a first metallic material, forming the buffer layer, such that the core head is covered with the first material; filling the capsule with a second metallic material, forming the cladding layer; subjecting the capsule to Hot Isostatic Pressing (HIP) at a predetermined temperature, a predetermined isostatic pressure and for a predetermined time so that the preformed core body, the buffer layer, the cladding layer and the valve seat are bonded metallurgically.

15 Claims, 3 Drawing Sheets

(51) Int. Cl.
  *B22F 7/08* (2006.01)
  *F01L 3/04* (2006.01)
  *B22F 3/15* (2006.01)
  *B22F 5/00* (2006.01)
  *F01L 3/00* (2006.01)

(52) U.S. Cl.
  CPC *F01L 3/20* (2013.01); *F16K 1/12* (2013.01); *F01L 3/00* (2013.01)

(58) Field of Classification Search
  USPC .................... 251/256, 266–268; 29/890.132
  See application file for complete search history.

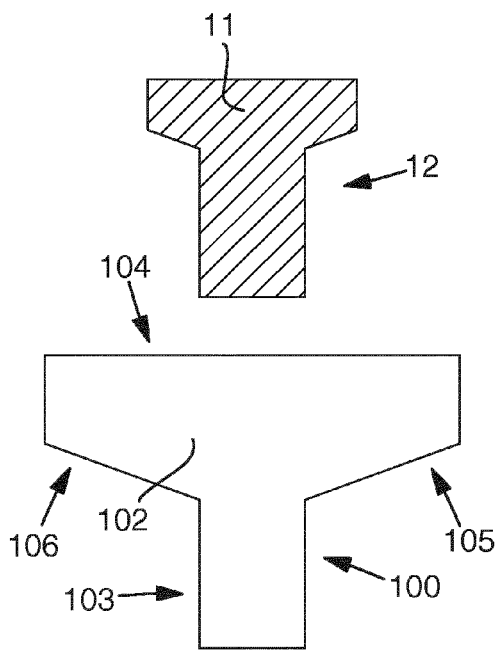
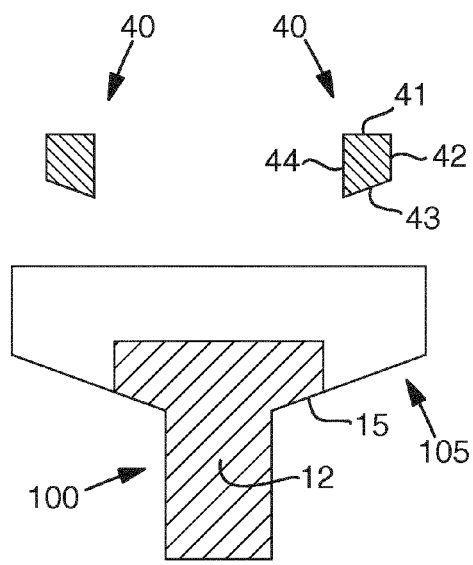
Figure 3a
Figure 3b
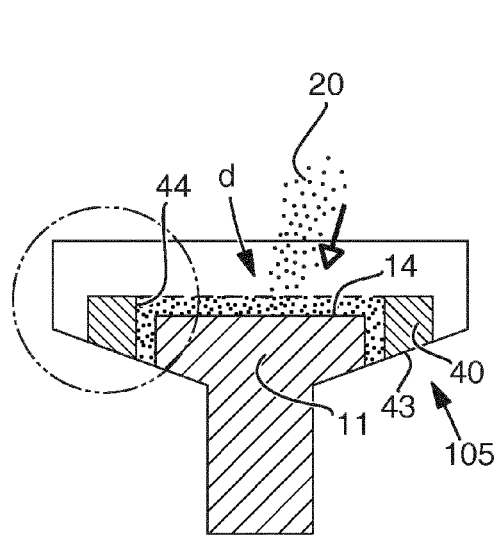
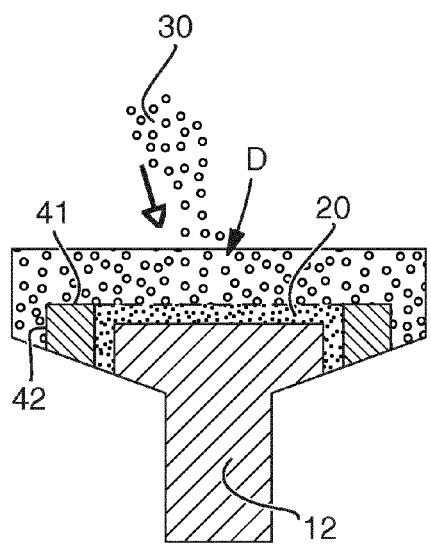
Figure 3c
Figure 3d

METHOD FOR MANUFACTURING A VALVE SPINDLE

RELATED APPLICATION DATA

This application is a §371 National Stage Application of PCT International Application No. PCT/EP2014/054724 filed Mar. 11, 2014, claiming priority of EP Application No. 13446502.0, filed Mar. 18, 2013.

TECHNICAL FIELD

The present invention relates to a method for manufacturing a valve spindle comprising a valve disc and a valve stem according to the preamble of claim 1. The present invention also relates to a valve spindle according to the preamble of claim 12.

BACKGROUND ART

Valve spindles are integrated in combustion engines to control the flow of air and exhaust gases to and from the cylinders of the engine.

Modern two-stroke diesel engines are subjected to increasing environmental demands regarding the emission of gases, such as CO, NOx and sulphur. To meet these demands and to reduce emissions, the combustion temperatures have been increased in the engine. This has in turn led to increasing corrosion of the engine's components, in particular, the exhaust valve spindle.

Valve spindles are typically forged from medium carbon construction steels and to increase their resistance to corrosion, the valve spindle's valve disc may be provided with a corrosion resistant cladding. Initially, the cladding was welded to the valve disc. However, in recent development the corrosion resistant cladding is applied in the form of a metallic powder to the valve spindle by Hot Isostatic Pressing (HIP). In order to prevent diffusion of carbon from the valve disc to the corrosion resistant cladding, a buffer layer of low carbon steel is applied directly onto the forged valve disc prior to application of the cladding.

WO2010/083831 shows an example of a forged valve spindle which comprises an outer cladding of a corrosion resistant material and a buffer layer that has been applied onto the valve spindle by HIP. The valve spindle further comprises a valve seat which is integrated in the upper surface of the valve disc.

One problem with known valve spindles is that carbon may diffuse from the forged steel material into the seat of the valve spindle. Carbon may reduce the ductility and the corrosion resistance of the seat material and thereby reduce the life time of the valve spindle.

Another problem associated with the known valve spindle is that the powder materials of the buffer layer may blend into cladding powder and cause a zone of mixed buffer- and cladding powders in some areas of the valve spindle. In the periphery of the valve disc, severe corrosive conditions exist during operation of the engine. In this area contamination, such as carbon, from the buffer material may reduce the resistance of corrosion of the cladding material to an extent where the lifetime of the valve spindle is reduced.

A further drawback in the manufacture of the known valve spindles is that the manufacturing process is complicated and involves several subsequent Hot Isostatic Pressing steps.

Hence, it is an object of the present invention to solve at least one of the problems of the prior art. In particular, it is an object of the present invention to achieve a simple and cost effective method for manufacturing a valve spindle, which spindle may sustain long term use without failure. A further object of the present invention is to achieve a valve spindle which may sustain long term use without failure.

SUMMARY OF THE INVENTION

According to a first aspect of the invention, the above object is achieved by a method for manufacturing a valve spindle 1 comprising a valve disc 2, comprising the steps:
  providing a capsule 100, which defines at least a portion of the valve disc 2;
  arranging, in said capsule 100, a preformed core body 12 that comprises a core head 11 which forms an inner portion of the valve disc 2;
  arranging a preformed annular valve seat 40 in said capsule 100, wherein the valve seat 40 is arranged such that the inner circumferential surface of the valve seat 40, at least partially, defines an inner space (d) around the core head 11;
  filling the inner space (d) with a first metallic material, which will form the buffer layer 20, such that the core head 11 is covered with said first material.
  filling the capsule 100 with a second metallic material, which will form the cladding layer 30;
  subjecting said capsule 100 to Hot Isostatic Pressing (HIP) at a predetermined temperature, a predetermined isostatic pressure and for a predetermined time so that the preformed core body 12, the buffer layer 20, the cladding layer 30 and the valve seat 40 are metallurgical bonded.

According to the present invention, the first metallic material is selected from a material which is different from the second metallic material.

In the inventive valve spindle, it is important that the cladding material and the valve seat are isolated from the carbon containing core element. It is also important to avoid mixing the cladding powder with the buffer powder and/or the valve seat material to the extent possible. By arranging the annular valve seat around the core head, which constitutes an internal portion of the valve disc, these two requirements are easily fulfilled. Additionally, the inventive method is labor effective and can be performed at a low cost as no additional components or substances are involved other than those already comprised in the design of the valve spindle. A further advantage of the inventive method is that all components of the valve spindle are arranged in the capsule prior to HIP:ing, which is performed only once. This makes the method fast and easy to perform.

In practice, the preformed annular valve seat forms a barrier between the core head and the cladding layer of the valve disc. There is therefore no need to arrange a layer of buffer powder directly next to the cladding powder in this area of the valve disc. This is advantageous since it is very complicated to arrange two different powders next to each other in such a way that the two powders have an interface in the vertical direction without mixing the powders. Instead, in the inventive method, it suffices to isolate the valve seat from the vertical side of the core head by a layer of buffer powder. The buffer powder is easily filled into the space (d) which the annular valve element forms around the core head of the core element and there is no risk that the buffer powder is mixed with the cladding powder.

The present invention also relates to a valve spindle 1 comprising a valve disc 2 having an exhaust side 4 and a valve stem 3, wherein said valve disc comprises: a preformed core body 12, a buffer layer 20, an outer cladding layer 30 and a preformed annular valve seat 40; wherein said preformed core body 12 comprises a core head 11 which forms an inner portion of the valve disc 2, wherein the core head 11 comprises a top surface 14 directed towards the exhaust side 4 of the valve spindle and an edge surface 16; wherein the buffer layer 20 is arranged such that it covers the core head 11; characterized in that, the preformed valve seat 40 is arranged between the buffer layer 20 and the cladding layer 30 and surrounds the core head 11 and that the valve seat 40, in direction towards the exhaust side 4 of the valve disc 2, extends along the buffer layer 20 of the core head 11.

Further alternatives and embodiments of the present invention are disclosed in the dependent claims and the following detailed description.

BRIEF DESCRIPTION OF DRAWINGS

FIGS. 3a-3f show schematically the steps of the inventive method for manufacturing a valve spindle according to the first alternative.

DETAILED DESCRIPTION OF THE INVENTION

Figure 1:
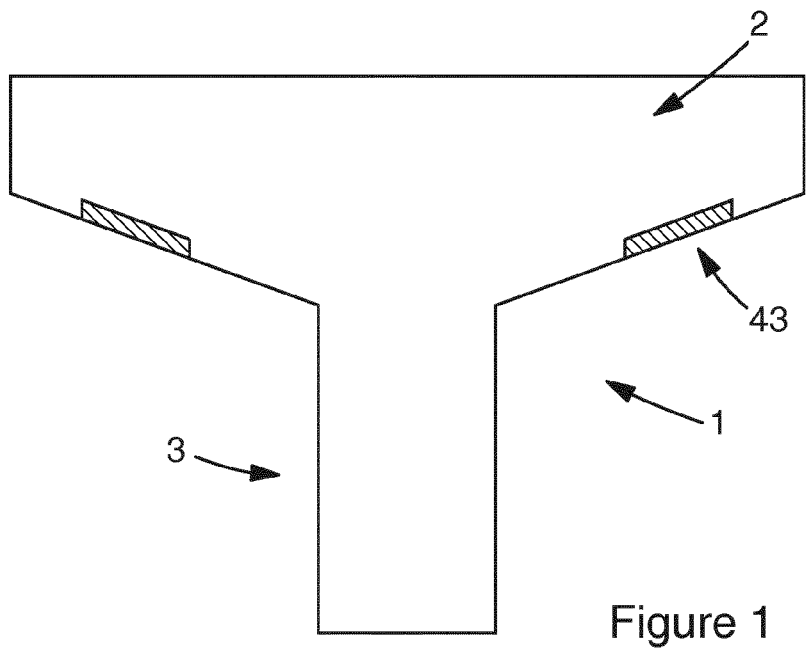
FIG. 1 shows schematically a valve spindle according to a first alternative of the invention.

FIG. 1 shows schematically a valve spindle 1 according to a first alternative of the present invention. The valve spindle in FIG. 1 is depicted in a front view, but it is of circular cross-section. The valve spindle 1 is intended for combustion engines such as two-stroke diesel engines for marine vessels and comprises a valve disc 2, a valve stem 3 and a valve seat 43. In operation, the valve seat 43 abuts against another valve seat in the cylinder of an combustion engine (not shown in FIG. 1).

The inventive valve spindle 1 will in the following be described in detail with reference to FIG. 2, which shows the valve spindle of FIG. 1 in a cross-sectional front view.

The valve disc 2 of the valve spindle extends from one end of the valve stem 3, which has a generally straight cylindrical form. However, the valve stem 3 could also be tapered towards the end. The upper side 4 of the valve disc 2 is a planar surface which, in the engine, faces the cylinder room. This surface may also be called the exhaust side 4 or the exhaust surface 4, and faces away from the valve stem 3. The lower side 5 of the valve disc 2 slopes from the valve stem 3 towards the upper side 4 of the valve disc 2. This surface may also be referred to as the seat surface 5 or the seat side 5 of the valve disc 2. The lower side 5 of the valve disc 2 may further comprise an edge portion 6 which extends vertically between the upper 4 and lower 5 surfaces of the valve disc 2. The edge portion 6 may also form an angle with the lower side of the disc 2. It is also possible that the upper sloping surface 5 extends directly between the valve stem and the exhaust side of the valve disc.

Figure 2:
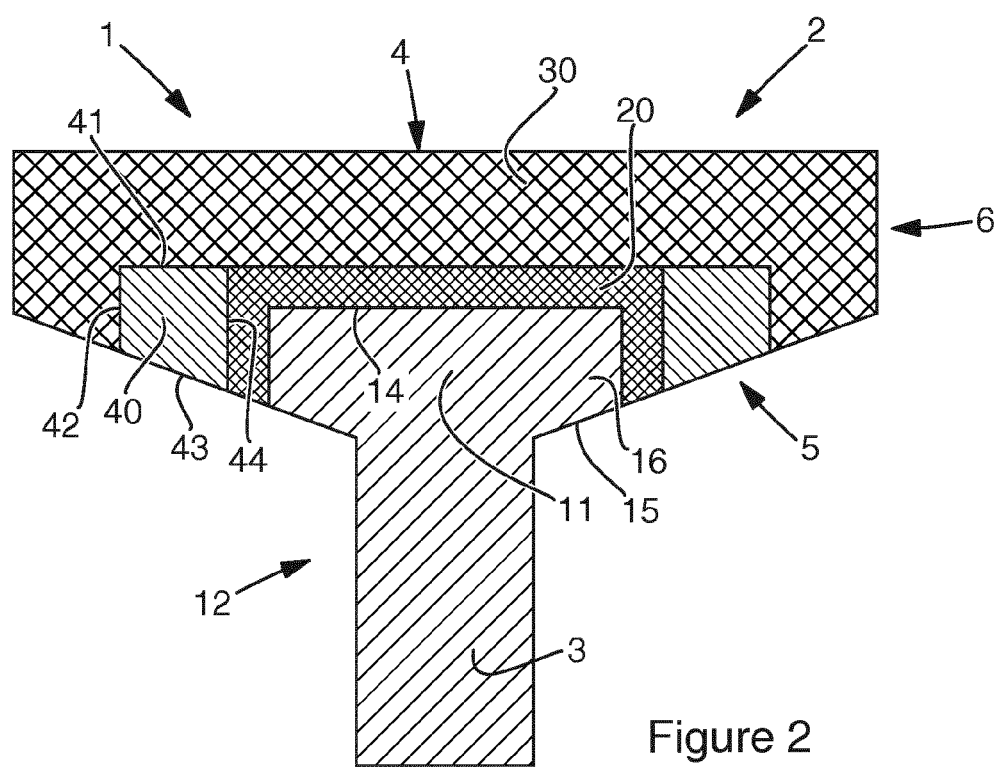
FIG. 2 shows schematically the valve spindle according to the first alternative of the invention in cross-section.

The valve spindle 1 further comprises a preformed core body 12, which in FIG. 2 comprises the valve stem 3 and a core head 11, which is integrated in the valve disc 2 such that the core head 11 forms an inner portion of the valve disc 2. The shape of the preformed core body 12 corresponds essentially to the shape of the valve spindle 1. Hence, the core head 11 comprises an upper planar exhaust side 14 facing away from the valve stem 3. The core head 11 further comprises an edge portion 16, which is directed towards the edge 6 of the valve disc 2. The preformed core body 12 has further a lower side 15 which slopes between the valve stem 3 and the edge portion 16 of the core head 11. The lower side 15 may be referred to as the valve seat side 15 of preformed core body 12. The edge portion 16 of the core head 11 may extend vertically from the seat side 15 to the upper side 14 of the core head 11. It may also form an angle with the upper side 14 of core head 11 and the seat side 15. The preformed core body 12 may be manufactured by forging a solid block of alloyed steel which typically has a carbon content of 0.15-0-35 wt %. One example of a suitable steel for the preformed core is the commercially available SNCrW-steel. It is also possible that the preformed core body 12 is manufactured in advance by HIP of powder material or that the preformed core body 12 comprises several separate parts that have been welded together.

A buffer layer 20 is applied onto the core head 11 of the preformed core body 12. The buffer layer 20 covers the upper side 14 and the edge portion 16 of the core head 11 so that the buffer layer 20 forms a continuous layer over the upper side 14 and the edge portion 16 of the core head 11. The purpose of the buffer layer 20 is to prevent carbon from diffusing from the preformed core body 12 into the valve seat 40 or into the cladding layer 30 of the valve spindle. The buffer layer 20 may consist of low carbon steel, having a carbon content of 0-0.09 wt % carbon. The buffer layer may further be alloyed with chromium in an amount of 12-25 wt % for example 14-20 wt %. One suitable material for the buffer layer is the commercially available 316L-steel. In principle, the buffer layer absorbs carbon from the core element and binds the carbon in the buffer layer through the formation of chromium rich carbides. The buffer layer should be thick enough to form a continuous layer between the core element and the valve seat. The thickness of the buffer layer further depends on the amount of carbon in the core element and the operational conditions in the engine, for example the thickness of the buffer layer is in the range of 2-10 mm, such as of from 3-7 mm, such as 3 mm or 5 mm.

The valve spindle 1 further comprises an annular, i.e. ring-shaped, valve seat 40, which will be described more in detail on the following pages. The valve seat 40 comprises a lower side 43 which is exposed on the lower surface 5 of the valve disc 2. The valve seat 40 further comprises an upper side 41, an inner circumferential wall 44 and an outer circumferential wall 42. The valve seat 40 is arranged such that it surrounds the core head 11. The inner circumferential wall 44 of the valve seat extends towards the exhaust side 4 of the valve disc 2 and is in contact with the buffer layer 20 covering the edge portion 16 of the core head 11. As can be seen in FIG. 2, the circumferential wall 44 extends past, i.e. beyond, the top surface 14 of the core head 11 so that the buffer layer 20 on the top surface 14 of the core head 11 is enclosed by the inner circumferential wall 44. The valve seat 40 is manufactured from a material which has high toughness, high hardness and good resistance to hot corrosion. Such materials includes precipitation hardening alloys such nickel base- or coboIt based comprising one or several of the elements molybdenum, chromium, niobium, aluminum or titanium. It is important that the alloy used for the valve seat is free from carbon since it is arranged in contact with the cladding material. For example, the valve seat may be manufactured from the commercially available alloy Inconel 718.

The upper portion of the valve disc 2 consists of a cladding layer 30. The cladding layer 30 forms the exhaust side 4 and the peripheral portion of the valve disc 2, i.e. the edge and area close to the edge portion 6 of the valve disc 2. The cladding layer 30 covers the buffer layer 20 on the upper side 14 of the core head 11. It also covers the upper side 41 and the outer wall side 42 of the valve seat 40. The cladding layer is manufactured from a highly corrosion resistant alloy. The alloy may be a nickel based alloy comprising Cr, Nb, Al and Mo. Examples of suitable alloys for the cladding layer are the commercially available alloys Ni49Cr1Nb or Inconel 657.

For more details regarding suitable materials for the valve seat, the buffer layer and the cladding layer it is referred to WO2010/08383, which document is enclosed in this application by reference.

The process for manufacturing the inventive valve spindle will in the following be described with reference to FIGS. 3a-3f.

In a first step of the inventive method, see FIG. 3a, a preformed core body 12 is arranged in a capsule 100, which defines the outer shape or contour of the inventive valve spindle. The capsule is typically manufactured from steel sheets that have been shaped into a suitable form by e.g. pressing or press turning and welded together. Preferably, the steel sheets are manufactured from steel having a low content of carbon. For example a low carbon steel having a carbon content of 0-0.09 wt % carbon. Examples of suitable steel for the capsule are the commercially available steels DC04, DC05 or DC06 available from the company SSAB. Such steels are suitable since they provide a minimum of carbon diffusion to the valve spindle. A further advantage of these steel grades is that they may easily be removed by pickling in acid. The capsule 100 is of circular cross-section and consists of a lower cylindrical portion 103 having the form of the stem 3 of the valve spindle 1. The upper portion of the capsule 102 has the form of the valve disc 2 of the valve spindle 1. Hence, the upper portion of the capsule 102 comprises an upper exhaust side 104, which defines the exhaust side 4 of the valve disc 2, and a lower seat side 105, which defines the sloping seat side 5 of the valve disc 2. The capsule 100 may also comprise an edge side 106, which defines the edge portion 6 of valve disc.

The preformed core body 12 is inserted through the upper portion 104 of the capsule 100 such that the stem 3 of the preformed core body 12 is positioned in the lower cylindrical portion 103 of the capsule 100 and such that the seat side 15 of the preformed core body 12 is in contact with the seat side 105 of the capsule 100 and such that the core head 11 extends into the space defined within the upper portion 102 of the capsule 100. The core head 11 will thereby constitute an inner portion of the final valve disc 2. It is also possible that the capsule 100 only consists of the upper portion 102. In that case, the upper portion 102 of the capsule 100 is welded directly to the stem 3 of the preformed core body 12.

It is also possible that the preformed core body 12 only consists of the core head 11 or of the core head 11 and the seat side 15. In that case, the stem 3 may be attached to the core body 12 after the HIP:ing. For example, the stem 3 may be attached to the core body 12 by friction welding.

In a second step, see FIG. 3b, an annular valve seat 40 is inserted into the capsule 100. FIG. 3b shows the annular valve seat 40 in a cross-sectional front view, however in reality the valve seat is of circular and of rotational-symmetric shape. The valve seat 40 comprises a lower valve seat side 43 which corresponds to the shape of the valve side 105 of the capsule 100 so that the lower seat side of the valve seat 40 may be placed in direct contact with the valve side of the 105 of the capsule 100. Hence, the inclination of the lower valve seat is identical to the inclination of the valve side 105 of the capsule 100. The valve seat 40 further comprises an upper side 41, which is directed to the exhaust side 104 of the capsule 100. The valve seat 40 further comprises an inner circumferential wall side 44 which is opposite to an external circumferential wall side 42. The contour of the inner wall 44 corresponds to the outer contour of the core head 11, i.e. the contour of the inner wall 44 of the valve seat 40 is the same as the outer contour of the edge portion 16 of the core head 11. This ensures the forming of a uniform spacing (d) between the valve seat 40 and the core head 11. In FIG. 1b, the contour of the inner wall 44 of the valve seat 40 and the contour of the edge portion 16 of the core head 11 is planar. However, these could be of any shape, such as corrugated.

The valve seat 40 is pre-manufactured, i.e. manufactured in advance. The valve seat may be manufactured by casting forging and/or machining. However, preferably the valve seat is pre-manufactured by sintering of metallic powder material, for example commercially available Inconel 718. The valve seat is thereby manufactured by sintering of the metallic powder material in a mould, which mould defines the shape of the valve seat. Sintering is performed at atmospheric pressure and at a temperature below the melting point of the powder material, thus ensuring that individual powder particles adhere to each other. For example, the sintering temperature is in the range of from 950-1050° C., such as 1000° C. Since sintering is performed at relatively low temperatures, negative effects on the mechanical properties of the valve seat are avoided.

The advantage of using a valve seat of sintered powder is that the valve seat can be given a very precise form, much more accurate than what can be achieved by other methods, such as by forging or casting. Yet, the sintered valve seat is strong and can easily be handled and can be positioned very accurately in the capsule. This makes it possible to arrange the valve seat with a very precise contact interface against other components in the capsule 100, thereby avoiding displacement and dislocation of the various components in the capsule during HIP. Furthermore, since the valve seat is sintered, it will have essentially the same porosity as the other powder materials in the capsule prior to HIP:ing. In the final HIP step, which is performed at high pressure, i.e. exceeding 500 bar, the valve seat will therefore deform and shrink in the same manner as the other powder materials in the capsule. This makes it possible to both predetermine and to compensate for the shrinkage during HIP:ing and thus enabling high dimensional accuracy of the final product.

FIG. 3c shows the arrangement of the valve seat 40 in the capsule 100. The valve seat 40 is arranged in the capsule 100 such that it surrounds the core head 11, which protrudes into the empty space in the capsule 100. More in detail, the seat side 43 of the valve seat 40 is placed in contact with the seat side 105 of the capsule 100 such that the top side 41 of the valve seat 40 is directed towards the exhaust side 104 of the capsule and such that the inner circumferential wall side 44 surrounds the edge portion 16 and the upper surface 14 of the core head 11.

The valve seat 40 is dimensioned such that the inner circumferential wall 44 forms a space (d) around the core head 11 of the preformed core body 12. This is achieved by using a larger inner diameter of the annular valve seat compared with the outer diameter of the core head 11. The details of the space (d) are further explained with reference to FIG. 4, which shows an enlargement of the circled area in FIG. 3c. Hence, the inner diameter of the valve seat 40 is selected such that a spacing (h) is achieved between the inner circumferential wall 44 of the valve seat and the edge portion 16 of the core head 11. The annular valve seat 40 may further be designed such that the inner wall side 44 extends a distance (H) above the upper side 14 of the core 11. The distance (H) determines the upper limit of the space (d) formed by the annular valve seat 40. This is schematically shown by the dashed line 50 in FIG. 4. The spacing (h) and the distance (H) determines the thickness of the buffer layer 20 applied to core head 11 in a subsequent step and these are selected in dependency of the materials used in the inventive valve spindle and of the operational conditions that the valve spindle is subjected to. The spacing (h) and the distance (H) could have any dimension, they could be of the same dimension or be of different dimensions. For example the spacing (h) and distance (H) could be in the range of from 2-10 mm, such as 3-7 mm or 3 mm or 5 mm.

The lower limit of the space (d) is defined by the seat side 105 of the capsule 100, which forms a bottom for the space (d).

As is shown in FIGS. 3a-3f, the capsule 100 for the valve spindle 1 has the shape of a funnel, i.e. the seat side 105 of the capsule 100 is inclined and slopes between the cylindrical portion 103 and the upper portion 102 of the capsule. Depending on how steep the inclination of the seat side 105 is and on how wide the spacing (h) between the seat ring 40 and the core head 11 is, a portion of the seat side 105 of the capsule could also be considered to surround the head portion 11. The space (d) around the core head is therefore defined partially by the inner circumferential side 44 of the seat ring and by a portion of the seat side 105 of the capsule 100.

Thereafter, see FIG. 3c, the space (d) is filled with a first particulate metallic material 20, i.e. a powder, which constitutes the buffer material and hence will form the buffer layer 20. As described above, the buffer material may be a powder of low carbon steel and have a sieve size of <500 µm. The buffer material is first poured into the spacing h between the inner circumferential wall 44 of the valve seat 40 and the edge portion 16 of the core head 11. Thereafter, the upper surface 14 of the core head 11 is covered with buffer material. Since the inner side 44 of the valve seat extends a distance (H) above the upper surface 14 of the core head 11, the buffer material is confined to the upper surface 14, thereby achieving that the upper surface 14 of the core head 11 easily can be covered with buffer material in powder form without risking that the buffer material leaks into areas which will be filled with cladding material in a subsequent method step. After filling the space (d) with buffer material, an outer space (D) is achieved between the inner limits of the upper portion 102 of the capsule and the space that is occupied by the valve seat 40, the buffer material and the core element in the capsule 100.

In a following step, see FIG. 3d, the remaining empty space (D) of the capsule 100 is filled with particulate metallic cladding material, i.e. a powder. Thereby, the buffer material on the upper surface 14 of the core head 11 as well as the top side 41 and the external wall side 42 of the valve seat 40 are embedded in cladding material. The cladding powder 30 forms the exhaust side and the peripheral areas of the valve disc and thereby completes the valve disc 2 of the inventive valve spindle 1. Also during filling of the cladding material, the annular valve seat 40 confines the buffer material to the space (d) defined by the inner circumferential wall side 44 of the valve seat 40 and prevents mixing of buffer- and cladding material. In particular, since the inner wall 44 extends above the top of the core head 11 by a distance (H), it prevents the buffer material on the periphery of top surface 14 of the core head 11 from being dragged down by the cladding material into the peripheral portions of the capsule 100.

Figure 3E:
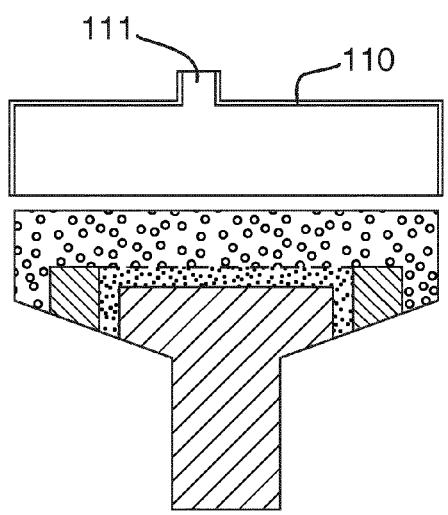
Figure 4:
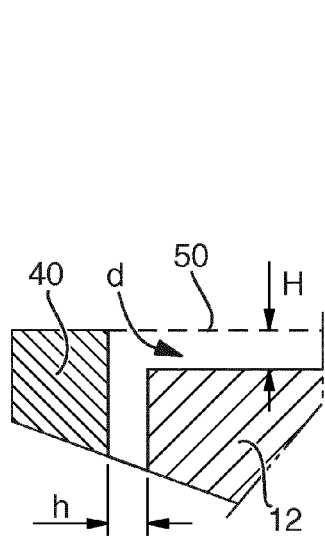
FIG. 4 shows schematically an enlargement of the encircled area of FIG. 1c.

In a following step, see FIG. 3e, the capsule 100 is closed by a lid 110, which lid is welded gas tight around the upper opening of the capsule. A vacuum may be drawn through an opening 111 in the lid 110, so that as little as possible residual air remains in the capsule. After vacuuming the opening is welded shut.

Figure 3F:
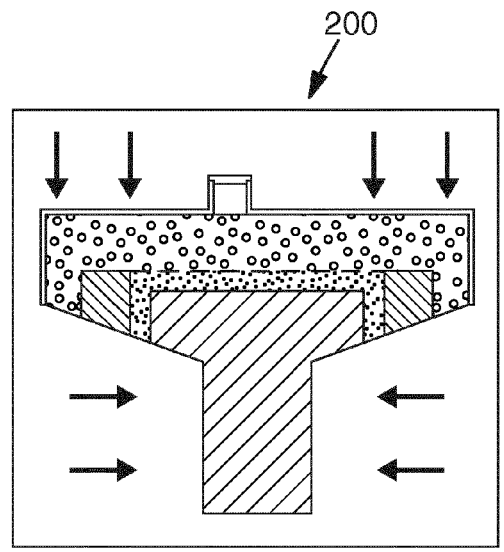

Thereafter, see FIG. 3f, the capsule 100 is subjected to Hot Isostatic Pressing (HIP) at a predetermined temperature, a predetermined isostatic pressure and for a predetermined time so that the core element, the valve seat, the buffer layer and the cladding layer bond metallurgical to each other. The capsule 100 is therefore placed in a heatable pressure chamber 200, normally referred to as a Hot Isostatic Pressing-chamber (HIP-chamber).

The heating chamber is pressurized with gas, e.g. argon gas, to an isostatic pressure in excess of 500 bar. Typically, the isostatic pressure is in the range of from 900-1200 bar. The chamber is heated to a temperature below the melting point of the material with the lowest melting point. The closer to the melting point the temperature is, the higher is the risk for the formation of melted phase in which brittle streaks could be formed. Therefore, the temperature should be as low as possible in the furnace during HIP:ing. However, at low temperatures the diffusion process slows down and the material will contain residual porosity and the metallurgical bond between the different materials becomes weak. Therefore, the temperature is in the range of from 900-1150° C., preferably of from 1000-1150° C. The capsule 100 is held in the heating chamber 200 at the predetermined pressure and the predetermined temperature for a predetermined time period. The diffusion processes that take place between the powder particles during HIP:ing are time dependent so long process times are preferred. Preferable, the form should be HIP:ed for a time period of from 0.5-3 hours, preferably of from 1-2 hours, most preferred 1 hour.

During HIP:ing, the particles of the buffer and cladding materials and deform plastically and bond metallurgically through various diffusion processes to each other and to the preformed core 12 and the valve seat 40 so that a dense, coherent article of closed cross-section is formed. In metallurgic bonding, metallic surfaces bond together flawlessly with an interface that is free of defects such as oxides, inclusions or other contaminants.

After HIP:ing the capsule 100 is stripped from the consolidated valve spindle 40, for example by pickling in acid. Alternatively, the capsule 100 may be left on valve spindle 40.

Although particular embodiments have been disclosed in detail, this has been done for purpose of illustration only, and is not intended to be limiting. In particular it is contemplated that various substitutions, alterations and modifications may be made within the scope of the appended claims. For example, the valve disc 2 may be flat. See FIG. 5, which shows a capsule 100 which defines the shape of valve spindle having a flat exhaust side 104 and a flat seat side 105 and an inclined edge side 106. A core element is arranged in the capsule 100 such that the core head 11 extends into the upper portion 102 of the capsule 100. An annular valve seat 40 is placed in contact with the lower surface 105 of capsule 100 so that the inner circumferential side 44 of the valve seat

Figure 5:
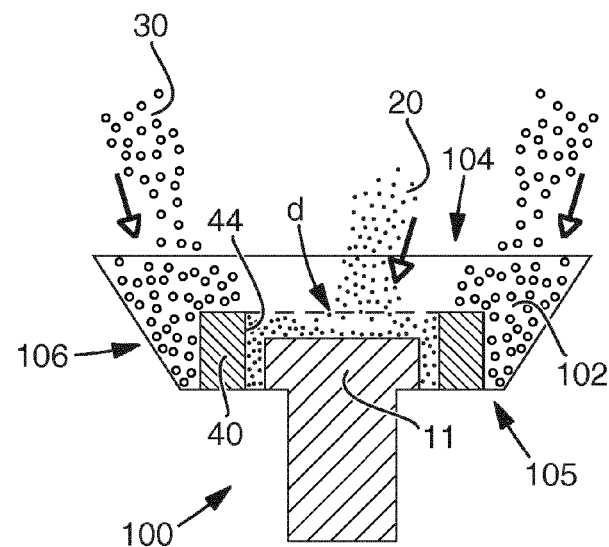
FIG. 5 shows schematically a capsule for manufacturing a valve spindle according to a second alternative of the invention.

40 defines a space (d) around the core head 11. The bottom of the space (d) formed by a portion of the seat surface 105 of the capsule 100. FIG. 5 also shows the step of filling buffer material 20 and cladding material 30 into the capsule 100.

The invention claimed is:

1. A method for manufacturing a valve spindle having a valve disc and a valve stem, the method comprising the steps of:
   providing a capsule which defines at least a portion of the valve disc;
   arranging, in said capsule, a preformed core body that includes a core head, which constitutes an inner portion of the valve disc;
   arranging a preformed annular valve seat in said capsule, wherein the valve seat is arranged such that the inner circumferential side of the valve seat at least partially defines an inner space around the core head;
   filling the inner space with a first metallic material, which will form a buffer layer, such that the core head is covered with said first material;
   filling the capsule with a second metallic material, which will form a cladding layer; and
   subjecting said capsule to Hot Isostatic Pressing at a predetermined temperature, a predetermined isostatic pressure and for a predetermined time so that the preformed core body, the buffer layer, the cladding layer and the valve seat are bonded metallurgically.

2. The method according to claim 1, wherein the diameter of the annular valve seat is selected such that a predetermined spacing is achieved between the inner circumferential side of the valve seat and the core head.

3. The method according to claim 2, wherein the valve seat extends a predetermined distance above an upper surface of the core head.

4. The method according to claim 1, wherein a seat side of the capsule defines a bottom of the space.

5. The method according to claim 1, wherein the capsule includes an upper capsule portion, which defines the shape of the valve disc of the valve spindle and wherein the core head includes an upper surface and an edge portion, the core head extending into the upper capsule portion and thereby forming an internal portion of the valve disc.

6. The method according to claim 5, wherein the upper capsule portion includes the lower seat side, and wherein the preformed core body includes a seat portion, wherein the preformed core body is arranged in the capsule such that the seat portion of the preformed core is in contact with the lower seat side of the capsule and such that the head core extends into the space defined by the upper capsule portion.

7. The method according to claim 6, wherein the valve seat has a lower seat side, the valve seat being arranged in the capsule such that the lower side of the valve seat is in contact with the lower seat side of the upper capsule portion and wherein the valve seat extends into the space defined by the upper capsule portion such that inner circumferential wall extends beyond the upper surface of the core head.

8. The method according to claim 1, wherein the valve seat is manufactured from sintered particulate metallic material.

9. The method according to claim 1, wherein an outer space is formed between the upper capsule portion of the capsule and the annular valve seat and the buffer layer, whereby the outer space is filled with the second metallic material forming the cladding layer.

10. The method according claim 1, wherein the preformed core body includes a head portion which constitutes an inner portion of the valve disc and a valve stem.

11. The method according to claim 1, wherein the preformed core body includes the head portion and wherein a valve stem is attached to the core body after Hot Isostatic Pressing.

12. A valve spindle including a valve disc having an exhaust side and a valve stem, wherein said valve disc comprises:
    a preformed core body, a buffer layer, an outer cladding layer and a preformed annular valve seat;
    said preformed core body including a core head which forms an inner portion of the valve disc, wherein the core head includes a top surface directed towards an exhaust side of the valve spindle and an edge surface, the buffer layer being arranged such that it covers the core head, wherein the preformed annular valve seat is arranged between the buffer layer and the cladding layer and surrounds the core head and in that the preformed annular valve seat, in direction towards the exhaust side of the valve disc, extends along the buffer layer of the core head.

13. The valve spindle according to claim 12, wherein the preformed annular valve seat has an inner circumferential wall, wherein the inner circumferential wall extends, in a direction towards the exhaust side of the valve disc, along the buffer layer on the edge portion of the core head.

14. The valve spindle according to claim 13, wherein the inner circumferential wall extends beyond the top surface of the core head.

15. The valve spindle according to claim 12, wherein the preformed annular valve seat includes an outer circumferential wall and wherein the outer circumferential wall is in contact with the cladding layer and inner circumferential wall is in contact with the buffer layer.

* * * * *